(12) United States Patent
Bandaru et al.

(10) Patent No.: US 9,710,436 B1
(45) Date of Patent: Jul. 18, 2017

(54) METHOD AND SYSTEM FOR GENERATING A MODIFIED WEBSITE

(71) Applicants: Nagaraju Bandaru, San Jose, CA (US); Nirmala Ranganathan, Saratoga, CA (US); Nivethitha Kumar, Sunnyvale, CA (US)

(72) Inventors: Nagaraju Bandaru, San Jose, CA (US); Nirmala Ranganathan, Saratoga, CA (US); Nivethitha Kumar, Sunnyvale, CA (US)

(73) Assignee: Intuit Inc., Mountain View, CA (US)

(*) Notice: Subject to any disclaimer, the term of this patent is extended or adjusted under 35 U.S.C. 154(b) by 859 days.

(21) Appl. No.: 14/136,902

(22) Filed: Dec. 20, 2013

Related U.S. Application Data

(63) Continuation of application No. 13/077,683, filed on Mar. 31, 2011, now Pat. No. 8,645,411.

(51) Int. Cl.
*G06F 17/21* (2006.01)
*G06F 17/27* (2006.01)
*H04L 12/26* (2006.01)

(52) U.S. Cl.
CPC ........ *G06F 17/217* (2013.01); *G06F 17/2705* (2013.01); *H04L 43/10* (2013.01)

(58) Field of Classification Search
CPC ............... G06Q 30/02; G06Q 30/0246; G06Q 30/0251; G06F 17/30864; G06F 17/217
USPC .......... 707/709, 769, 711, 999.003–999.006; 705/14, 14.42
See application file for complete search history.

(56) References Cited

U.S. PATENT DOCUMENTS

2004/0267612 A1 12/2004 Veach
2011/0184801 A1 7/2011 Zucker et al.
2012/0041938 A1* 2/2012 Yu ...................... G06Q 30/0251
707/709

* cited by examiner

*Primary Examiner* — Syling Yen
(74) *Attorney, Agent, or Firm* — Osha Liang LLP

(57) ABSTRACT

A method including receiving a website text item of the website, where the website text item is categorized by a text category and a website element category, identifying, multiple text items of multiple websites relating to multiple businesses in an industry, searching the multiple text items using the website element category to identify multiple comparable text items, parsing the website text item to generate multiple keywords, searching the multiple comparable text items using the multiple keywords to identify a comparable text item, where the comparable text item includes a conversion rate corresponding to a percentage of transactions completed by multiple website visitors accessing the comparable text item, identifying, a modified conversion text item from the multiple comparable text items, where the modified conversion text item has a modified conversion rate that exceeds the conversion rate, generating, a conversion improved website including the modified conversion text item.

16 Claims, 9 Drawing Sheets

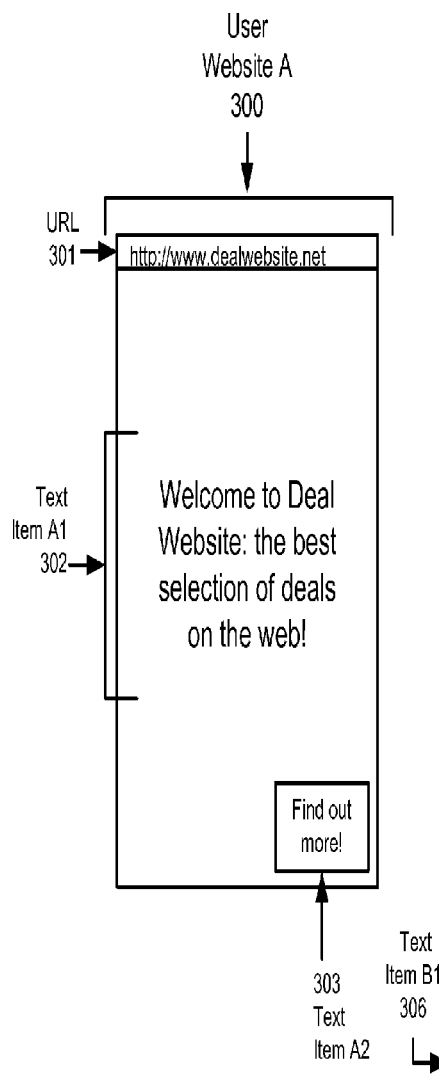
FIG. 3A
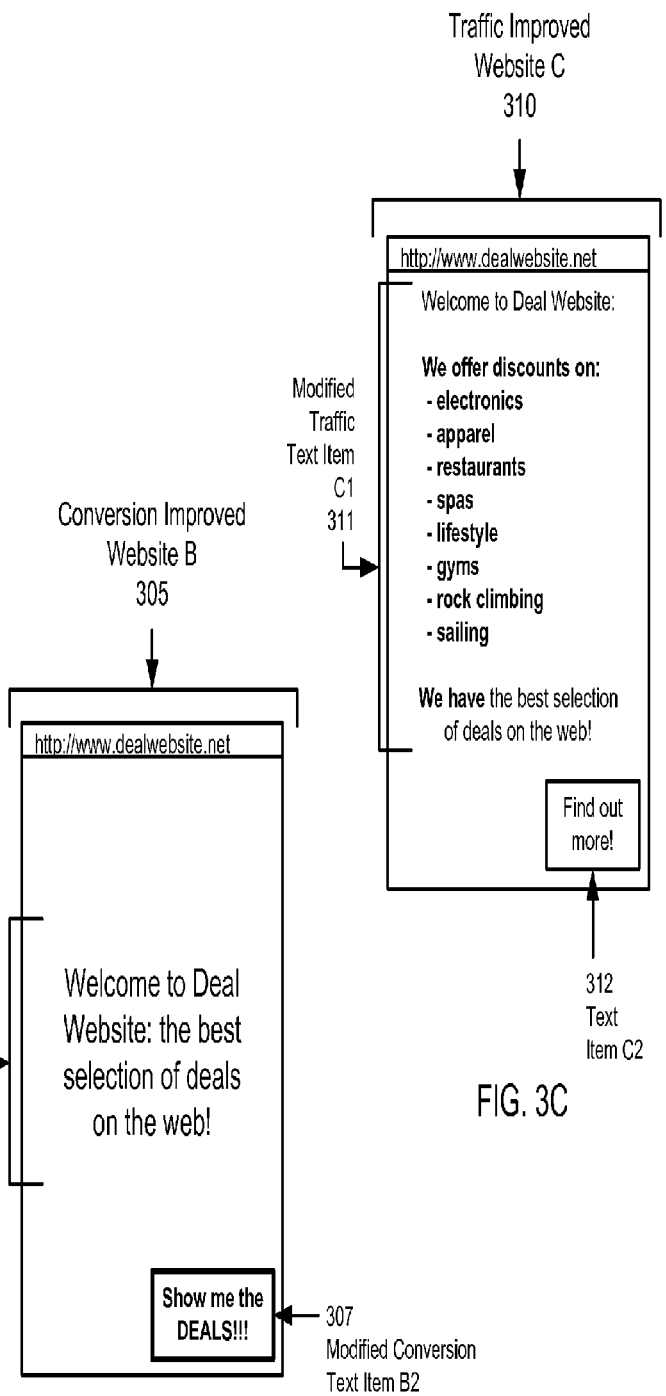
FIG. 3B
FIG. 3C

METHOD AND SYSTEM FOR GENERATING A MODIFIED WEBSITE

CROSS-REFERENCE TO RELATED APPLICATIONS

This application is a continuation application of U.S. patent application Ser. No. 13/077,683, filed Mar. 31, 2011, and entitled "METHOD AND SYSTEM FOR GENERATING A MODIFIED WEBSITE." Accordingly, this application claims benefit of U.S. patent application Ser. No. 13/077,683 under 35 U.S.C. §120. U.S. patent application Ser. No. 13/077,683 is hereby incorporated in its entirety.

The present application contains subject matter that may be related to the subject matter in the U.S. application Ser. No. 13/077,714 entitled "WEBSITE CREATION AND MANAGEMENT BASED ON WEB ANALYTICS DATA", filed on Mar. 31, 2011, and assigned to the assignee of the present application.

BACKGROUND

In recent years, websites have become a major distribution channel for businesses. The ability for a business to maintain an online presence through a website, where the business can sell goods and/or services, has changed the nature of commerce. The Internet has greatly increased the ease of reaching customers and distributing products. Accordingly, many businesses maintain websites as an alternative sales and distribution channel to sell products/services (in addition to brick and mortar outlets). Additionally, many businesses maintain only an online presence (i.e. the business only sell products and/or services through a website on the Internet).

With the increase in the popularity of the Internet, whole industries have been created that focus on improving websites as a distribution and sales channel. Search engine optimization, or SEO, is a marketing discipline that focuses on optimizing the ranking that a website receives in an Internet search engine. A higher ranking often leads to greater web traffic, and higher conversion (e.g. more sales). Many factors, beyond the ranking of a website in a search engine, often contribute to the traffic flow to a website and conversion of visitors into purchasers of a product. These factors may include the language used in a website, the placement of certain elements in a website, the design of the website, the style of the website, and so forth. Therefore, specific elements of a website may have a significant impact on the success of the website in selling goods and/or services to customers. Typically, website owners identify these elements on their own through trial and error, or hire a third party consulting firm to enhance these website elements. These efforts are typically focused on the website itself, and usually do not incorporate known traffic and/or conversion trends from other websites in the same space as the particular website.

SUMMARY

In general, in one aspect, the invention relates to a method for managing a website. The method comprises receiving, from a user, a website text item of the website, wherein the website text item is categorized by a text category and a website element category. The method further comprises identifying, using the text category, a plurality of text items of a plurality of websites relating to a plurality of businesses in an industry. The method further comprises searching, using a processor, the plurality of text items using the website element category to identify a plurality of comparable text items. The method further comprises parsing the website text item to generate a plurality of keywords. The method further comprises searching, using the processor, the plurality of comparable text items using the plurality of keywords to identify a comparable text item, wherein the comparable text item comprises a conversion rate corresponding to a percentage of transactions completed by a plurality of website visitors accessing the comparable text item. The method further comprises identifying, using the processor, a modified conversion text item from the plurality of comparable text items, wherein the modified conversion text item has a modified conversion rate that exceeds the conversion rate. The method further comprises generating, using the processor, a conversion improved website comprising the modified conversion text item. The method further comprises receiving, from a user, an approval of the conversion improved website.

In general, in one aspect, the invention relates to a system for managing a website relating to an industry. The system comprises a web analytics application executing the on the processor and configured to receive, from a user, a website text item of the website, wherein the website text item is categorized by a text category and a website element category, identify, using the text category, a plurality of text items of a plurality of websites relating to a plurality of businesses in an industry, search, using a processor, the plurality of text items using the website element category to identify a plurality of comparable text items, parse the website text item to generate a plurality of keywords, search, using the processor, the plurality of comparable text items using the plurality of keywords to identify a comparable text item, wherein the comparable text item comprises a conversion rate corresponding to a percentage of transactions completed by a plurality of website visitors accessing the comparable text item, identify, using the processor, a modified conversion text item from the plurality of comparable text items, wherein the modified conversion text item has a modified conversion rate that exceeds the conversion rate, generate, using the processor, a conversion improved website comprising the modified conversion text item, and receive, from a user, an approval of the conversion improved website.

In general, in one aspect, the invention relates to a non-transitory computer readable storage medium storing instructions for managing a website relating to an industry. The instructions comprise functionality to receive, from a user, a website text item of the website, wherein the website text item is categorized by a text category and a website element category. The instructions further comprise functionality to identify, using the text category, a plurality of text items of a plurality of websites relating to a plurality of businesses in an industry. The instructions further comprise functionality to search, using a processor, the plurality of text items using the website element category to identify a plurality of comparable text items. The instructions further comprise functionality to parse the website text item to generate a plurality of keywords. The instructions further comprise functionality to search, using the processor, the plurality of comparable text items using the plurality of keywords to identify a comparable text item, wherein the comparable text item comprises a conversion rate corresponding to a percentage of transactions completed by a plurality of website visitors accessing the comparable text item. The instructions further comprise functionality to identify, using the processor, a modified conversion text item from the plurality of comparable text items, wherein the modified conversion text item has a modified conversion rate that exceeds the conversion rate. The instructions further comprise functionality to generate, using the processor, a conversion improved website comprising the modified conversion text item. The instructions further comprise functionality to receive, from a user, an approval of the conversion improved website.

Other aspects of the invention will be apparent from the following description and the appended claims.

BRIEF DESCRIPTION OF DRAWINGS

FIGS. 3A, 3B, and 3C show user website, conversion improved website, and traffic improved website examples in accordance with one or more embodiments of the invention.

DETAILED DESCRIPTION

Figure 1:
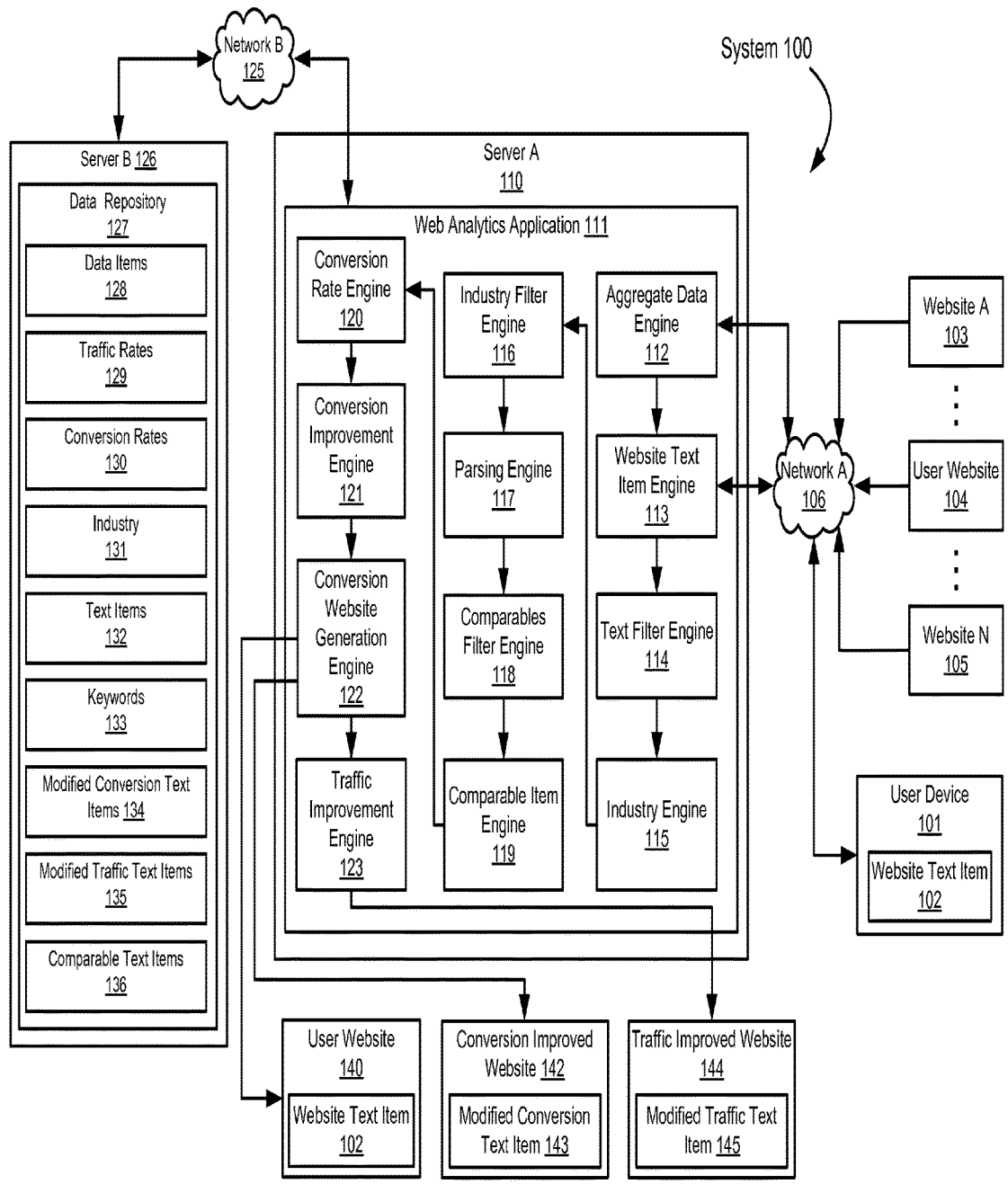
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for managing a website. Specifically, data elements are obtained, from various websites, and aggregated into a pool of data. The pool of data may then be filtered using specific variables such as industry to obtain a data item that is comparable to a website text item received from a user. Once the comparable item is identified, another data item with a greater conversion rate, traffic rate, or other website metric is identified, and used to generate an improved website for the user. This improved website is generated based on data from various other websites that subscribe to a service provided by the developer of the software application that manages the websites. Those skilled in the art will appreciate that there may be various other embodiments and functionalities of the invention.

FIG. 1 shows a system (100) in accordance with one or more embodiments of the invention. As shown in FIG. 1, the system (100) includes components such as a user device (101), a website A (103) through a website N (105), a web analytics application (111), a server A (110) and a server B (126), a data repository (127), a user website (140), a conversion improved website (142), and a traffic improved website (144). The web analytics application (111) may contain an aggregate data engine (112), a website text item engine (113), a text filter engine (114), an industry engine (115), an industry filter engine (116), a parsing engine (117), a comparables filter engine (118), a comparable item engine (119), a conversion rate engine (120), a conversion improvement engine (121), a conversion website generation engine (122), and a traffic improvement engine (123). These components are described below and may be located on the same device (e.g. a server, a mainframe, a desktop Personal Computer (PC), a laptop, a Personal Digital Assistant (PDA), a telephone, a mobile/smart phone, a kiosk, a cable box, and/or any other device) or may be located on separate devices connected by a network (e.g. the Internet, a wide area network (WAN), or a local area network (LAN)), with wired and/or wireless segments. In one or more embodiments of the invention, more than one of the application and/or engine components described herein may be running (i.e., executing in whole or in part) on a device, as well as more than one user device, website, and user website interfacing with those components.

In one or more embodiments of the invention, a user device (101) is any device that may contain a website text item (102). For example, the user device (101) may be a client computer, a mobile device such as smart phone, traditional cell phone, or a tablet computer, or any other similar hardware device. The website text item (102) is text that is associated with a user website (e.g. user website (104)) in accordance with one or more embodiments of the invention. For instance, the website text item (102) may be a paragraph of text associated with the homepage of a website, the text in a button on a website, annotation text for an image in a website, the text in a hyperlink on a website, and so forth. Essentially, the website text item (102) may be any text that is used on a website of a user. Further, the website text item (102) may be generated by a user that owns and/or manages a website. The user device (101) may transfer website text item (102) to web analytics application (111) via network A (106).

In one or more embodiments of the invention, website A (103), user website (104), and website N (105) are Internet websites. Website A (103) through website N (105) may be associated with (e.g. subscribers of a service provided by) the web analytics application (111). For instance, website A (103) through website N (105) may subscribe to a service provided by web analytics application (111) that manages, maintains, and improves content on each website. In return for these services, website A (103) through website N (105) may allow the web analytics application (111) to access all of the data of each website, and store such data on the data repository (127). Each of website A (103) through website N (105) may be associated with a specific business and industry. For example, a website may be associated with a travel agency business, in which case it would also be associated with the travel industry. Another website may be associated with a network business, and accordingly also the network hardware industry.

Those skilled in the art will appreciate that website A (103) through website N (105) may be associated with any conceivable industry. Website A (103) through website N (105) may also provide the web analytics application (111) access to operational data related to the business associated with a particular website. Operational data may include headcount, revenues, geographic locations, sales by geographic region, margins, cost of goods sold, and so forth. Website A (103) through website N (105) may transmit data to the web analytics application (111) via network A (106). Those skilled in the art will appreciate that website A (103)

through website N (105) may contain other types of data than described above. In one or more embodiments of the invention, website A (103) through website N (105) and/or the data associated with website A (103) through website N (105) may be owned, managed, and/or operated by individuals.

In one or more embodiments of the invention, server A (110) is configured to the host web analytics application (111), which is configured to manage websites. The web analytics application (111) is a software application that includes several engines configured to perform specific functions to manage websites. Specifically, the engines operating as part of the web analytics application (111) may include functionality to obtain data items from websites, obtain traffic rates and conversion rates of data items, store data items, traffic rates, and conversion rates in a data repository, receive website text items from users, identify text items from the data items, identify an industry, identify text items associated with the industry, parse the website text item to generate keywords, search the text items using a website element category to identify comparable text items, identify a comparable text item, identify a conversion rate of the comparable text item, identify a modified conversion text item that has a modified conversion rate that exceeds the conversion rate of the comparable text item, generate a conversion improved website, generate a traffic improved website, and perform other calculations associated with managing websites.

The web analytics application (111) may receive input from various sources, including user device (101), website A (103), user website (104), and website N (105). The web analytics application (111) may store and/or access data in data repository (127). Server A (110), the web analytics application (111), and other data stored on server A (110) may be owned and/or operated by a service provider (e.g. the owner, developer, and/or manager of the web analytics application). Each engine of the web analytics application (111) is described below. Those skilled in the art will appreciate that each of the engines described may have other functionality beyond that disclosed, and that the functionality of each engine may alternatively be performed by any of the other engines.

In one or more embodiments of the invention, the aggregate data engine (112) is configured to obtain data items from websites, obtain traffic rates and conversion rates of those data items, and store the data items, traffic rates, and conversion rates in a data repository. The data items may be any element of a website, such as text, images, sounds, video, hyperlinks, buttons, slideshows, themes, interactive applications, and so forth. A traffic rate indicates the amount of data sent and received by visitors to a website. In other words, a traffic rate may be a number of total website visits by website visitors. Traffic rates are determined by the number of visitors and the number of pages they visit. It is possible to monitor incoming and outgoing traffic to see which portions of a website are popular. This may reveal traffic trends. For instance, a specific portion of a website (e.g. a landing page) may be viewed mostly by people in a particular geographic region (e.g. the United States of America, California, San Francisco, etc.). Websites often attempt to increase their web traffic through the use of search engines and search engine optimization (SEO) techniques. Website traffic may be analyzed by viewing statistics found in, for example, a web server log file (i.e. a list of all the pages viewed). A page view is generated when a visitor requests any page within the web site. Further, tracking applications can record traffic to a website by inserting a small piece of HyperText Markup Language (HTML) code in every page of the website.

The following types of data may be analyzed when monitoring website traffic—number of visitors, average number of page views per visitor, average visit duration, average page duration, domain classes, busy times, most requested pages (i.e. most popular pages), most requested entry pages, most requested exit pages, top paths, and top referrers. A high average number of page views per visitor may indicate that the average visitor navigates deep into the hierarchy of the website (i.e. navigates through many pages). This may indicate that the visitor finds the website useful. The average visit duration indicates the total length of a user's visit. Generally, the more time a visitor spends on a website, the more interested that visitor is in the website (and company, service, product, and/or good associated with that website). The average page duration indicates the length of time a page is viewed. Greater average page durations, and more viewed pages, are preferable for a website. Domain classes refer to levels of the Internet Protocol (IP) addressing information required to deliver webpages and content to website viewers.

Busy times indicate the most popular viewing time of a website. For example, busy times may indicate when may be the best time to perform, for example, a promotional campaign versus maintenance of a website. The most requested entry pages (i.e. the first pages viewed by a visitor) indicates which entry page is attracting the most visitors. The most requested exit pages may aid the identification of dysfunctional pages, broken links, or popular external links on exit pages. A path is the sequence of pages viewed by website visitors from entry to exit. The top paths identify the route most customers take through the website. In the case of referrers, a website host can track the source of the links into the website, and determine which external websites are generating the most traffic for a particular website page.

A conversion rate is the ratio of website visitors who convert casual content views or website visits into desired actions based on subtle or direct requests from marketers, advertisers, and/or content creators. Therefore, a conversion rate equals a number of goal achievements divided by a number of website visits. In other words, the conversion rate may be a percentage of transactions completed by a set of website visitors accessing a text item. Successful conversions are interpreted differently by individual marketers, advertisers, and content creators. For online retailers, for example, a successful conversion may constitute the sale of a product to a consumer that clicked on a banner advertisement. For content creators, a successful conversion may be a membership registration, newsletter subscription, software download, or other activity that occurs due to a subtle or direct request from the content creator for the visitor to take an action.

In one or more embodiments of the invention, the aggregate data engine (112) may receive data items, traffic rates, and conversion rates from website A (103) through website N (105) over network A (106). After receiving the data items, the traffic rates, and the conversion rates, the aggregate data engine (112) may process (i.e. modify, transform, format) the data items, traffic rates, and conversion rates, and then transmit the data items, traffic rates, and conversion rates to another (sub-)engine in the aggregate data engine (112) for further processing. During the process of receiving the data items, the traffic rates, and the conversion rates, the aggregate data engine (112) may use credentials of a user for validation. Specifically, in one or more embodiments, a user may provide credentials (e.g. social security number, birthdate, username, password, etc.) to the aggregate data application (112), which then stores this information internally in a user profile for use by the aggregate data engine (112). Alternatively, the user may be prompted by one or more engines within the aggregate data application (112) when credentials are necessary. Those skilled in the art will appreciate that the aggregate data engine (112) may receive the data items, the traffic rates, and the conversion rates from other entities beyond website A (103) through website N (105), and may perform other functions beyond those disclosed.

In one or more embodiments of the invention, the website text item engine (113) is configured to receive a website text item from a user. A website text item, as described above, is text that is associated with a user website. The website text item may belong to a text category and a website element category. The text category indicates that the website text item is a text element of a website. The website element category indicates the functionality of the website text item in a website. For example, the website element category may indicate that the website text item is submit button text, relating to a purchase button. The website element category may also indicate that the website text item is text relating to an introduction paragraph on a landing page of a website. Those skilled in the art will appreciate that the functionality of a website text item may be very important, and may significantly distinguish it from other website elements. The website text item engine (113) may receive website text items from a user device (101). After receiving a website text item, the website text item engine (113) may process (i.e. modify, transform, format) the website text item, and then transmit the website text item to the text filter engine (114) for further processing. In parallel, the website text item engine (113) may pass control to any other engine of the web analytics application (111). Those skilled in the art will appreciate that the website text item engine (113) may receive website text items from other entities beyond the user device (101), and may perform other functions beyond those disclosed.

In one or more embodiments of the invention, the text filter engine (114) is configured to identify text items from the data items using the text category. Text items are website elements, derived from the data items that are text. The text filter engine (114) may receive data items from aggregate data engine (112). After identifying text items, the text filter engine (114) may process (i.e. modify, transform, format) the text items, and then transmit the text items to the industry engine (115) for further processing. In parallel, the text filter engine (114) may pass control of the system (100) to any other engine of the web analytics application (111). Those skilled in the art will appreciate that the text filter engine (114) may receive data items from other entities beyond the aggregate data engine (112), and may perform other functions beyond those disclosed.

In one or more embodiments of the invention, the industry engine (115) is configured to identify an industry of a business relating to a website. An industry, as used herein, is a commercial sector in which a business participates. The industry engine (115) may identify the industry based on data received from the aggregate data engine (112) or the website text item engine (113). After identifying the industry, the industry engine (115) may process (i.e. modify, transform, format) the industry, and then pass control to any other engine. Those skilled in the art will appreciate that the industry engine (115) may receive data from other entities beyond the aggregate data engine (112) or the website text item engine (113), and may perform other functions beyond those disclosed.

In one or more embodiments of the invention, the industry filter engine (116) is configured to identify text items associated with websites related to businesses in the industry. In other words, the industry filter engine (116) filters the text items to extract the subset of text items that relate to the industry. The industry filter engine (116) may receive text items from the text filter engine (114). After filtering the text items, the industry filter engine (116) may process (i.e. modify, transform, format) the text items, and then transmit the text items to any other engine in the web analytics application (111). Those skilled in the art will appreciate that the industry filter engine (116) may receive text items from other entities beyond the text filter engine (114), and may perform other functions beyond those disclosed.

In one or more embodiments of the invention, a parsing engine (117) is configured to parse the website text item to generate keywords. As used herein, a keyword is a word that is part of the website text item. Parsing a website text item may include identifying specific words (i.e. keywords) in the website text item, and generating detailed analytics regarding the words (i.e. the frequency of each word, the length of each word, the type of each word, etc.). The parsing engine (117) may receive the website text item from the website text item engine (113). After receiving the website text item and generating keywords, the parsing engine (117) may process (i.e. modify, transform, format) the keywords, and then transmit the keywords to the comparables filter engine (118) for further processing. In parallel, the parsing engine (117) may pass control of the system (100) to any other engine. Those skilled in the art will appreciate that the parsing engine (117) may receive the website text item from other entities beyond the website text item engine (113), and may perform other functions beyond those disclosed.

In one or more embodiments of the invention, the comparables filter engine (118) is configured to search text items using the website element category to identify comparable text items. The comparable text items are text items, usually from websites other than the user website, that are comparable to the website text item in some way. For example, a comparable text item may have the same functionality in a website that the website text item has in the user website. The comparables filter engine (118) may receive text items from the aggregate data engine (112). Text items may originate from website A (103) through website N (105), usually not including user website (104). After identifying comparable text items, the comparables filter engine (118) may process (i.e. modify, transform, format) the comparable text items, and then transmit the comparable text items to the comparable item engine (119) for further processing. In parallel, the comparables filter engine (118) may pass control of the system (100) to any other engine. Those skilled in the art will appreciate that the comparables filter engine (118) may receive text items from other entities beyond the aggregate data engine (112), and may perform other functions beyond those disclosed.

In one or more embodiments of the invention, the comparable item engine (119) is configured to identify a comparable text item of the comparable text items, by searching the comparable text items using the keywords. A comparable text item is one of the comparable text items that contains the most keywords, as well as the keywords that are most relevant. The comparable item engine (119) may receive comparable text items from the comparables filter engine (118). After identifying a comparable text item, the comparable item engine (119) may process (i.e. modify, transform, format) the comparable text item, and then transmit the comparable text item to the conversion rate engine (120) for further processing. In parallel, the comparable item engine (119) may pass control of the system (100) to any other engine. Those skilled in the art will appreciate that the comparable item engine (119) may receive comparable text items from other entities beyond the comparables filter engine (118), and may perform other functions beyond those disclosed.

In one or more embodiments of the invention, the conversion rate engine (120) is configured to identify a conversion rate of the comparable text item. A conversion rate is a percentage of transactions completed by website visitors accessing the comparable text item. The conversion rate engine (120) may receive the comparable text item from the comparable item engine (119). After identifying a conversion rate, the conversion rate engine (120) may process (i.e. modify, transform, format) the conversion rate, and then transmit the comparable text item and/or conversion rate to the conversion improvement engine (121) for further processing. In parallel, the conversion rate engine (120) may pass control of the system (100) to any other engine. Those skilled in the art will appreciate that the conversion rate engine (120) may receive the comparable text item from other entities beyond the comparable item engine (119), and may perform other functions beyond those disclosed.

In one or more embodiments of the invention, the conversion improvement engine (121) is configured to identify a modified conversion text item that has a modified conversion rate. A modified conversion text item is one of the comparable text items that has its own conversion rate (i.e. the modified conversion rate) in accordance with one or more embodiments of the invention. The modified conversion text item is selected in such a way that the modified conversion rate of the modified conversion text item exceeds the conversion rate of the comparable text item. The conversion improvement engine (121) may receive the comparable text item from the conversion rate engine (120). After identifying a modified conversion text item, the conversion improvement engine (121) may process (i.e. modify, transform, format) the modified conversion text item, and then transmit the modified conversion text item and the modified conversion rate to the conversion generation website engine (122) for further processing. In parallel, the conversion improvement engine (121) may pass control of the system (100) to any other engine. Those skilled in the art will appreciate that the conversion improvement engine (121) may receive the comparable text item from other entities beyond the conversion rate engine (120), and may perform other functions beyond those disclosed.

In one or more embodiments of the invention, the conversion website generation engine (122) is configured to generate a conversion improved website that includes the modified conversion text item, display this conversion improved website to a user, receive a user acceptance or rejection of the conversion improved website, and generate a website including either the website text item (i.e. if the user rejects the conversion improved website) or the modified conversion text item (i.e. if the user accepts the conversion improved website). The conversion improved website is a version of the user website that has certain portions replaced with new content. Specifically, the conversion improved website may contain the modified conversion text item instead of the website text item. The conversion website generation engine (122) is further configured to display the final version of the website (i.e. which will become the user website) to the user. Ultimately, the conversion website generation engine (122) may generate the user website (140) or the conversion improved website (142), depending on the user's decision.

In one or more embodiments of the invention, the user website (140) contains website text item (102), and the conversion improved website (142) contains modified conversion text item (143). The conversion website generation engine (122) may receive the modified conversion text item from the conversion improvement engine (121). After generating the conversion improved website, the conversion website generation engine (122) may process (i.e. modify, transform, format) the conversion improved website, and then transmit the conversion improved website to the traffic improvement engine (123) for further processing. In parallel, the conversion website generation engine (122) may pass control of system (100) any other engine. Those skilled in the art will appreciate that the conversion website generation engine (122) may receive the modified conversion text item from other entities beyond the conversion improvement engine (121), and may perform other functions beyond those disclosed.

In one or more embodiments of the invention, the traffic improvement engine (123) is configured to identify a traffic rate of the modified conversion text item, identify a modified traffic text item that includes a modified traffic rate that exceeds the traffic rate, generate a traffic improved website that includes the modified traffic text item, display this traffic improved website to the user, receive a user acceptance or rejection of the traffic improved website, and generate a website including the modified traffic text item (i.e. if the user accepts the traffic improved website). The traffic improvement engine (123) may receive the traffic rate from the conversion website generation engine (122). After receiving the traffic rate, the traffic improvement engine (123) may process (i.e. modify, transform, format) the website, and generate the traffic improved website (144), containing one or more modified traffic text item (145). Those skilled in the art will appreciate that the traffic improvement engine (123) may receive the traffic rate from other entities beyond the conversion website generation engine (122), and may perform other functions beyond those disclosed.

In one or more embodiments of the invention, the server B (126) is configured to host a data repository (127). The data repository (127) may contain data associated with the web analytics application (111). The data may include the data items (128), the traffic rates (129), the conversion rates (130), the industry (131), the text items (132), the keywords (133), the modified conversion text items (134), the modified traffic text items (135), the comparable text items (136), and various other types of data.

The data repository (127) may be a relational database that stores data entries associated with the web analytics application (111). The data repository (127) may also be a spreadsheet containing data cells associated with the web analytics application (111). In one or more embodiments of the invention, the data repository (127) may be implemented with many technologies.

The data repository (127) may receive data from various sources, including the web analytics application (111), and any of the engines of the web analytics application (111), over network B (125). After receiving data from the web analytics application (111), the data repository may process (i.e. modify, transform, format) the data, and then store the data. Those skilled in the art will appreciate that the data repository (127) may receive and store data from other entities beyond the web analytics application (111), and may perform other functions beyond those disclosed. Further, server B (126) and the data stored on this server may be owned and/or operated by a service provider (e.g. the owner, developer, and/or manager of the web analytics application (111)).

In one or more embodiments of the invention, a GUI (not shown) may display information associated with the web analytics application (111). The GUI may be viewed in a web browser, an application window, and the like. The GUI may be viewed in these display technologies by a user of the web analytics application (111). The GUI may include standard web elements, including video, audio, and text, as well as interface technologies not limited to text submission on forms, voice capture, and user gesture interpretation. In one or more embodiments of the invention, there may be various other display technologies used to view the GUI.

Figure 2:
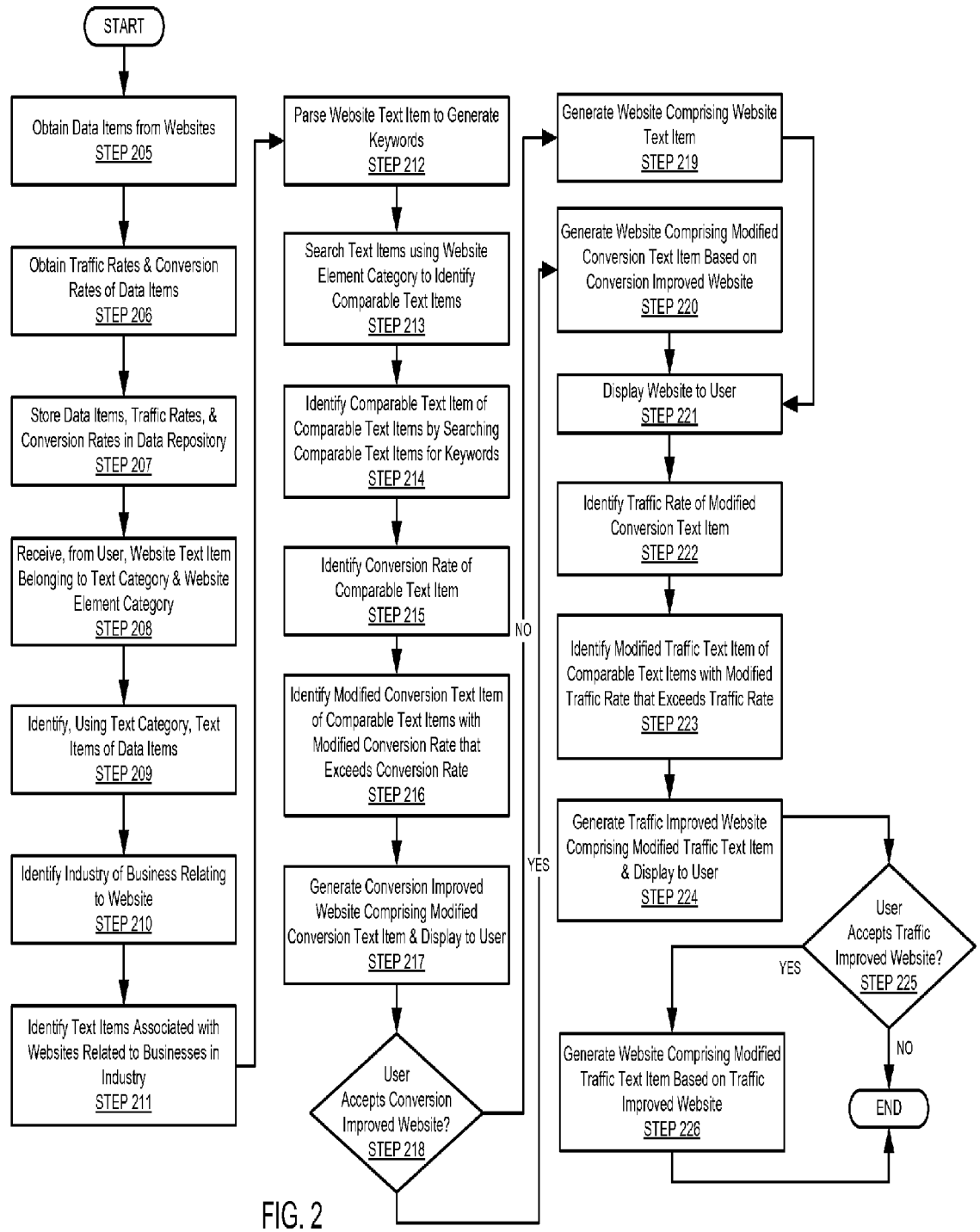
FIG. 2 shows a flowchart in accordance with one or more embodiments of the invention.

FIG. 2 shows a flowchart in accordance with one or more embodiments of the invention. The process shown in FIG. 2 may be used, for example, with the system (100) described above and shown in FIG. 1 to manage websites. The sequence of steps shown in FIG. 2 may differ among embodiments of the invention, and one or more of the steps may be performed in parallel and/or may be optional.

In STEP 205, data items are obtained from websites. Data items may be any element of a website, including text, images, and sounds, video, hyperlinks, buttons, slideshows, themes, and interactive applications. For example, a data item may be a button containing the text "buy me." The data items are obtained (and/or information gathered) from various websites that are associated with the software application, therefore after they are obtained, the data items may be put into an aggregate pool of data. This aggregate pool of data items may be analyzed and modified by the software application for various tasks.

In STEP 206, traffic rates and conversion rates of the data items are obtained. The traffic rates and conversion rates may be obtained from the websites or analytics maintained about the website found on the website itself or from third party sources. A traffic rate may be a number of total website visits by website visitors. For example, a traffic rate associated with the website from which a data item was obtained may be 20,000 visitors per month. A traffic rate of a data item refers to a total number of visits to that particular data item of the website. For example, the traffic rate of a landing page containing a landing page text data item may be 10,000 visitors per month. The conversion rate is a percentage of transactions completed by a set of website visitors accessing the data item. For instance, the conversion rate of a "buy me" button (i.e. a data item) on a website may be 60% (i.e. 60 out of every 100 visitor's clicks on the "buy me" button).

In STEP 207, the data items, traffic rates, and conversion rates are stored in a data repository. The data repository may be controlled by the owner, operator, and/or manager of the software application. Once the data items, traffic rates, and conversion rates are stored in the data repository, they may be accessed, modified, and/or analyzed as an aggregate data pool by the software application.

In STEP 208, a website text item is received from a user. The website text item may be, for example, text from a website of the user of the software application. The website text item may be text of a link on a landing page of the website, and may read "learn more about my product." The website text item may belong to the text category (i.e. indicating that the website text item is a piece of text), and a website element category. The website element category may indicate that the website text item has a certain functionality within the website. In this case, the website text item would qualify as landing page text, and therefore may be categorized as belonging to the "landing page" website element category.

In STEP 209, text items of the data items are identified. Text items are those data items that are portions of text within their respective websites. For example, a button would not be considered a text item, however the text "welcome to this website" would be considered a text item. The text items may be identified by, for instance, filtering the data items for those belonging to a text category.

In STEP 210, an industry of a business relating to the website (i.e. the user website) is identified. The industry may be, for example, "flowers" if the website relates to a flower business. The industry may be used as a filter for comparing websites relating to businesses in that industry.

In STEP 211, the text items associated with websites related to businesses in the industry are identified. For instance, the text items identified in STEP 209 may be filtered using the industry to identify those text items that relate to websites of businesses in the industry. This may be performed, for instance, to compare text items across websites in a single industry (e.g. the flower industry).

In STEP 212, the website text item is parsed to generate keywords. Parsing the website text item may include extracting every word that is an element of the website text item, organizing these words according to frequency, and generating keywords corresponding to the words that have been extracted. The keywords for the website text item "learn more about my product" may include "learn", "more", "about", "my", and "product". Keywords may be assigned weights according to their importance to the function of the website text item. In one embodiment of the invention, keywords that are commonly used to connect different parts of a sentence (e.g. "about") may be assigned a weight that is less than the weight assigned to a keyword that is considered a verb or a noun ("website").

In STEP 213, the text items are searched using the website element category. For instance, if the website element category is "landing page," referring to text items that occur on website landing pages, then text items that are searched using this website element category will be filtered to a subset of text items that occur on landing pages. These text items may be considered comparable text items, because they are text items that have comparable functionality to the website text item. In other words, this set of text items (i.e. the comparable text items) may be considered to be a group of text items originating from a set of websites (other than the user website) that are comparable to the website text item submitted by the user of the user website.

In STEP 214, a comparable text item of the comparable text items is identified. This is performed by searching the comparable text items for the keywords obtained from the website text item. Therefore, searching the comparable text items for the keywords produces a single comparable text item that best matches the keywords. This comparable text item may be the text item that has the most relevancy as determined by the keywords (i.e. contains the most relevant keywords). For example, the comparable text item may be the text of a link in a landing page of a website that reads "learn more about my goods."

In STEP 215, a conversion rate of the comparable text item is identified. Each comparable text item has an associated conversion rate. The conversion rate of the comparable text item is a percentage of transactions completed by a set of website visitors accessing the comparable text item. For instance, the conversion rate of the comparable text item that reads "learn more about my goods" may be 40% (i.e. 40 out of every 100 visitor's clicks on the link).

In STEP 216, a modified conversion text item is identified. The modified conversion text item also has a conversion rate, known as the modified conversion rate. The modified conversion text item is selected such that its conversion rate (i.e. the modified conversion rate) is greater than the conversion rate of the comparable text item. Therefore, the modified conversion text item has a greater percentage of transactions completed by a set of website visitors accessing the modified conversion text item than the comparable text item. For example, a modified conversion text item that includes the text "learn more about my flowers" may have a modified conversion rate of 50% (i.e. 50 out of every 100 visitor's clicks on the link). In this case, the inclusion of the keyword "flower" may have resulted in the extra 10% of conversion rate (i.e. 50% versus 40%), as the term "flower" may be viewed by website visitors as a more descriptive and meaningful term than "goods". The process of identifying a text item that is similar to the website text item (i.e. the comparable text item), and then subsequently identifying another text item that is in the same category as the comparable text item but has a better conversion rate than the comparable text item (i.e. the modified conversion text item) may aid in the generation of a website that has "better" (i.e. more effective) conversions than the original user website.

In STEP 217, a conversion improved website is generated. The conversion improved website contains the modified conversion text item. For example, in this case the conversion improved website contains the modified conversion text item that reads "learn more about my flowers." This website may be displayed to the user for review. This process may also be known as providing a recommendation to the user for a conversion improved website (i.e. a website that has a better conversion rate using the modified conversion text item than the website text item provided by the user). Those skilled in the art will appreciate that the process of generating a conversion improved website may occur dynamically (i.e. as a user is entering new text or modifying the text of an existing website). Alternatively, this process may store text entered by a user (i.e. the website text item), and then perform STEPS 209-217 using the website text item obtained from the storage location (e.g. a data repository). Dynamic website generation may occur continuously (i.e. every time a user edits his/her website by entering new text, the website recommendation, or conversion improved website, is dynamically generated).

In STEP 218, a determination is made whether the user accepts the conversion improved website. If the user accepts the conversion improved website, the process proceeds to STEP 220, otherwise it proceeds to STEP 219.

In STEP 219, a website including the website text item is generated. This is the case where the user rejects the modification of the user website to include the modified conversion text item instead of the website text item provided by the user. In this case, the website will be generated containing the original website text item (e.g. "learn more about my product").

In STEP 220, a website including the modified conversion text item is generated. This is the case where the user accepts the modification of the user website to include the modified conversion text item instead of the website text item provided by the user. In this case, the website will be generated containing the modified conversion text item (e.g. "learn more about my flowers").

In STEP 221, the website is displayed to the user. This is the most current version of the website that may be published to the Internet including the content approved by the user.

In STEP 222, a traffic rate of the modified conversion text item is identified. Each text item has an associated traffic rate. The traffic rate of the modified conversion text item is the number of total website visits by website visitors to the page or portion of the website that includes the modified conversion text item. For instance, the traffic rate of the modified conversion text item that reads "learn more about my flowers" may be 60% (i.e. 60 out of every 100 visitors arrive at the page containing this text item).

In STEP 223, a modified traffic text item is identified. The modified traffic text item also has a traffic rate, known as the modified traffic rate. The modified traffic text item is selected such that its traffic rate (i.e. the modified traffic rate) is greater than the traffic rate of the modified conversion text item. Therefore, the modified traffic text item has a greater number of total website visits by website visitors to the page or portion of the website that includes the modified traffic text item than the modified conversion text item. For example, a modified traffic text item that includes the text "learn more about my gift flowers" may have a modified traffic rate of 70% (i.e. 70 out of every 100 visitors arrive at the page containing this text item). In this case, the inclusion of the keyword "gift" may have resulted in the extra 10% of conversion rate (i.e. 70% versus 60%), as the term "gift" may be viewed favorably from an SEO perspective. The process of identifying a text item that is in the same category as the modified conversion text item but has a better traffic rate than modified conversion text item may result in the generation of a website that routes traffic "better" (i.e. more effectively) than the original user website or the website based on the modified conversion text item.

In STEP 224, a traffic improved website is generated. The traffic improved website contains the modified traffic text item. For example, in this case the traffic improved website contains the modified traffic text item that reads "learn more about my gift flowers." This website may be displayed to the user for review. This process may also be known as providing a recommendation to the user for a traffic improved website (i.e. a website that has a better traffic rate using the modified traffic text item than the website text item provided by the user or using the modified conversion text item).

In STEP 225, it is determined whether the user accepts the traffic improved website. If the user accepts the traffic improved website, then the process proceeds to STEP 226, otherwise the process ends.

In STEP 226, the website including the modified traffic text item is generated. This is the case where the user accepts the modification of the user website to include the modified traffic text item instead of the website text item provided by the user or the modified conversion text item. In this case, the website will be generated containing the modified traffic text item (e.g. "learn more about my gift flowers").

FIGS. 3A, 3B, and 3C show examples of a user website, a conversion improved website, and a traffic improved website, in accordance with one or more embodiments of the invention. The elements shown in FIGS. 3A, 3B, and 3C may be used, for example, with the system to generate conversion improved and/or traffic improved websites. The elements shown in FIGS. 3A, 3B, and 3C may differ among embodiments of the invention, and one or more of the elements may be optional.

FIG. 3A demonstrates user website A (300). The user website A (300) is a website owned, operated, and/or managed by a user that subscribes to a service related to the software application. For instance, the user may allow the software application access to the user website A (300) for the purpose of website maintenance, upgrading, and operation. The user website A (300) is located using uniform resource locator URL (301) (i.e. "http://www.dealwebsite.net"). The user website A (300) may be a website that offers electronic deals to customers in the form of discounts on products or services from other companies. The user website A (300) contains a text item A1 (302), which is introductory text on a page of the website (i.e. "Welcome to Deal Website: the best selection of deals on the web!"). The text item A1 (302) may correspond to a website text item as previously discussed, and may have been generated by the user. The user website A (300) also contains a text item A2 (303), which is text in a submission button on the page that leads to another page of the website (i.e. "Find out more!"). The text item A2 (303) may also correspond to a website text item as previously discussed, and may have also been generated by the user.

FIG. 3B demonstrates the conversion improved website B (305). The conversion improved website B (305) is a version of the user website A (300) that has been improved with respect to conversion of website visitors. The conversion improved website B (305) has the same URL as the user website A (300) (i.e. "http://www.dealwebsite.net"), as well as the same text on the page in the text item B1 (306) as the text item A1 (302) (i.e. "Welcome to Deal Website: the best selection of deals on the web!"). The conversion improved website B (305) has, however, been modified from the user website A (300) with the modified conversion text item B2 (307). The modified conversion text item B2 (307) replaces the text item A2 (303), and now reads "Show me the DEALS!!!" instead of "Find out more!" in the submission button. The modified conversion text item B2 (307) also has a bolder font than the text item A2 (303). Ostensibly, based on analysis of the aggregate data pool managed by the software application, the conversion improved website B (305) is now an improved version of the user website A (300) because the text item A2 (303) of the user website A (300) has been replaced with the modified conversion text item B2 (307). The modified conversion text item B2 (307) has a better conversion rate than the text item A2 (303), and therefore more visitors will be converted, or click on the button containing the text "Show me the DEALS!!!", than the button containing the text "Find out more!". This may result in more sales for the website. Those skilled in the art will appreciate that the modification of text to create a conversion improved website may include placing text in a different location on a webpage (e.g. moving the text of a button and the button itself from the bottom center of a webpage to the bottom right), changing the color of text (e.g. from black to blue), changing the font of text (e.g. from "Times New Roman" to "Arial"), and various other text modifications. Further, a conversion improved website may also be optimized for view within a social network (i.e. as a website and/or webpage that is viewed within a social network). For example, a website that is meant to be viewed within a social network may be modified to include text elements that allow users within the social network to link to the website, broadcast the website to other friends within the social network, "like" the website, and so forth. Those skilled in the art will appreciate that there may be many other similar modifications made to a website to configure it for more efficient use within a social network.

FIG. 3C demonstrates the traffic improved website C (310). The traffic improved website C (310) is a version of the user website A (300) that has been improved with respect to traffic of website visitors. The traffic improved website C (310) has the same URL as user the website A (300) (i.e. "http://www.dealwebsite.net"), as well as the same text in the submission button in the text item C2 (312) as the text item A2 (303) (i.e. "Find out more!"). The traffic improved website C (310) has, however, been modified from the user website A (300) with the modified traffic text item C1 (311). The modified traffic text item C1 (311) replaces the text item A1 (302), and now reads "Welcome to Deal Website: We offer discounts on: —electronics—apparel—restaurants—spas—lifestyle—gyms—rock climbing—sailing We have the best selection of deals on the web!" instead of "Welcome to Deal Website: the best selection of deals on the web!" in the text on the page. The modified traffic text item C1 (311) also contains portions with a bolder font than the text item A1 (302). Conceivably, based on analysis of the aggregate data pool managed by the software application, the traffic improved website C (310) is now an improved version of the user website A (300) because the text item A1 (302) of the user website A (300) has been replaced with the modified traffic text item C1 (311). The modified traffic text item C1 (311) has a better traffic rate than the text item A1 (302), and therefore more traffic, or visitors, will be lead to the website containing the text "Welcome to Deal Website: We offer discounts on: —electronics—apparel—restaurants—spas—lifestyle—gyms—rock climbing—sailing We have the best selection of deals on the web!" than the text "Welcome to Deal Website: the best selection of deals on the web!". Greater traffic to the website may result in more sales. Those skilled in the art will appreciate that the modifications made to generate the traffic improved website may alternatively be used to generate a conversion improved website. Further, the traffic improved website will typically also be a conversion improved website (i.e. it has been modified to generate better conversion rates as well as better traffic rates, and not only better traffic rates).

Figure 4A:
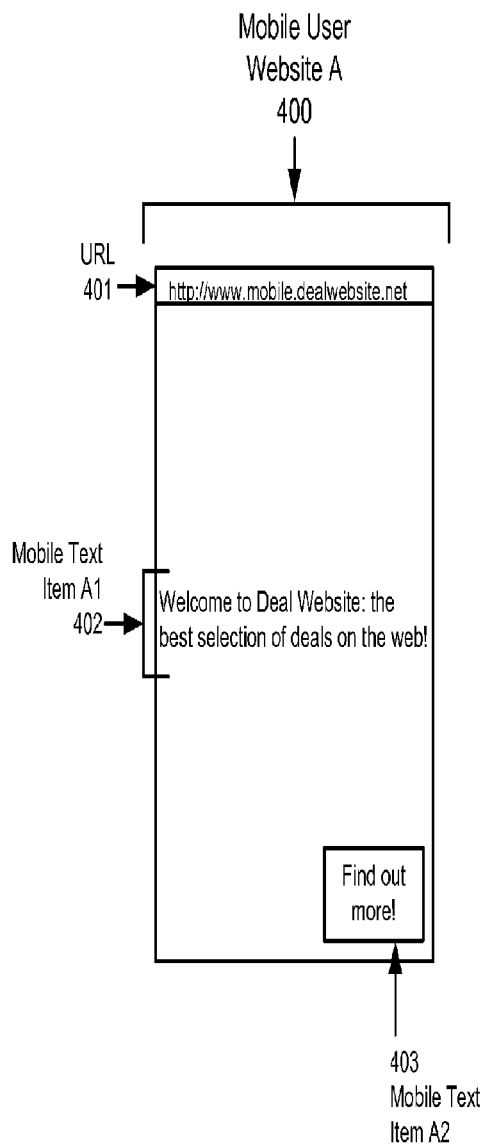
FIGS. 4A and 4B show mobile user website and mobile improved website examples in accordance with one or more embodiments of the invention.
Figure 4B:

FIGS. 4A and 4B show examples of mobile user and mobile improved websites, in accordance with one or more embodiments of the invention. The elements shown in FIGS. 4A and 4B may be used, for example, with the system to generate the mobile improved website. The elements shown in FIGS. 4A and 4B may differ among embodiments of the invention, and one or more of the elements may be optional.

FIG. 4A demonstrates a mobile user website A (400). The mobile user website A (400) is a mobile version of the user website A (300) described in FIG. 3A (i.e. the version that is viewed on mobile devices such as cell phones, portable gaming systems, PDAs, tablets, netbooks, and the like). The mobile user website A (400) has a mobile version of the URL of the user website A (300)—URL (401) (i.e. "http://www.mobile.dealswebsite.net"). The mobile user website A (400) also has text on the page—mobile text item A1 (402), which read "Welcome to Deal Website: the best selection of deals on the web!" The mobile text item A1 (402) has a particular font and alignment on the webpage (i.e. center, left aligned). The mobile user website A (400) also has a submission button including the text "Find out more!", identified as the mobile text item A2 (403). The content of the mobile user website A (400) may have been generated by a user, and may not have been optimized for the mobile device experience (e.g. font, alignment, text size, etc.).

FIG. 4B demonstrates the mobile improved website B (405). The mobile improved website B (405) is a version of the mobile user website A (400) that has been improved with respect to the user experience, the traffic rates, and/or the conversion rates of website visitors on a mobile platform.

The mobile improved website B (405) has the same URL as the mobile user website A (400) (i.e. "http://www.mobile.dealswebsite.net"). The mobile improved website B (405) has, however, been modified from the mobile user website A (400) with the modified mobile text item B1 (406). The modified mobile text item B1 (406) replaces the mobile text item A1 (402), and now reads "Welcome to Mobile Deal Website: the best selection of deals on the mobile web!" instead of "Welcome to Deal Website: the best selection of deals on the web!" in the text on the page. The modified mobile text item B1 (406) contains text written in a bolder and larger font than the mobile text item A1 (402). The modified mobile text item B2 (407) also replaces the mobile text item A2 (403), and now reads "Find out more!" instead of "Find out more!" in the submission button. The modified mobile text item B2 (407) has a bolder and larger font than the mobile text item A2 (403).

Based on analysis of the aggregate data pool managed by the software application, the mobile improved website B (405) is now an improved version of the mobile user website A (400) because the mobile text item A1 (402) of the mobile user website A (400) has been replaced with the modified mobile text item B1 (406), and the mobile text item A2 (403) has been replaced with the modified mobile text item B2 (407). These modified text items have better traffic rates, conversion rates, and/or user interfaces on a mobile platform than the mobile text item A1 (402) and the mobile text item A2 (403). The result is more traffic, more conversions, and/or a better user experience than the original mobile user website A (400). This improvement may result in more sales for the website.

Figure 5:
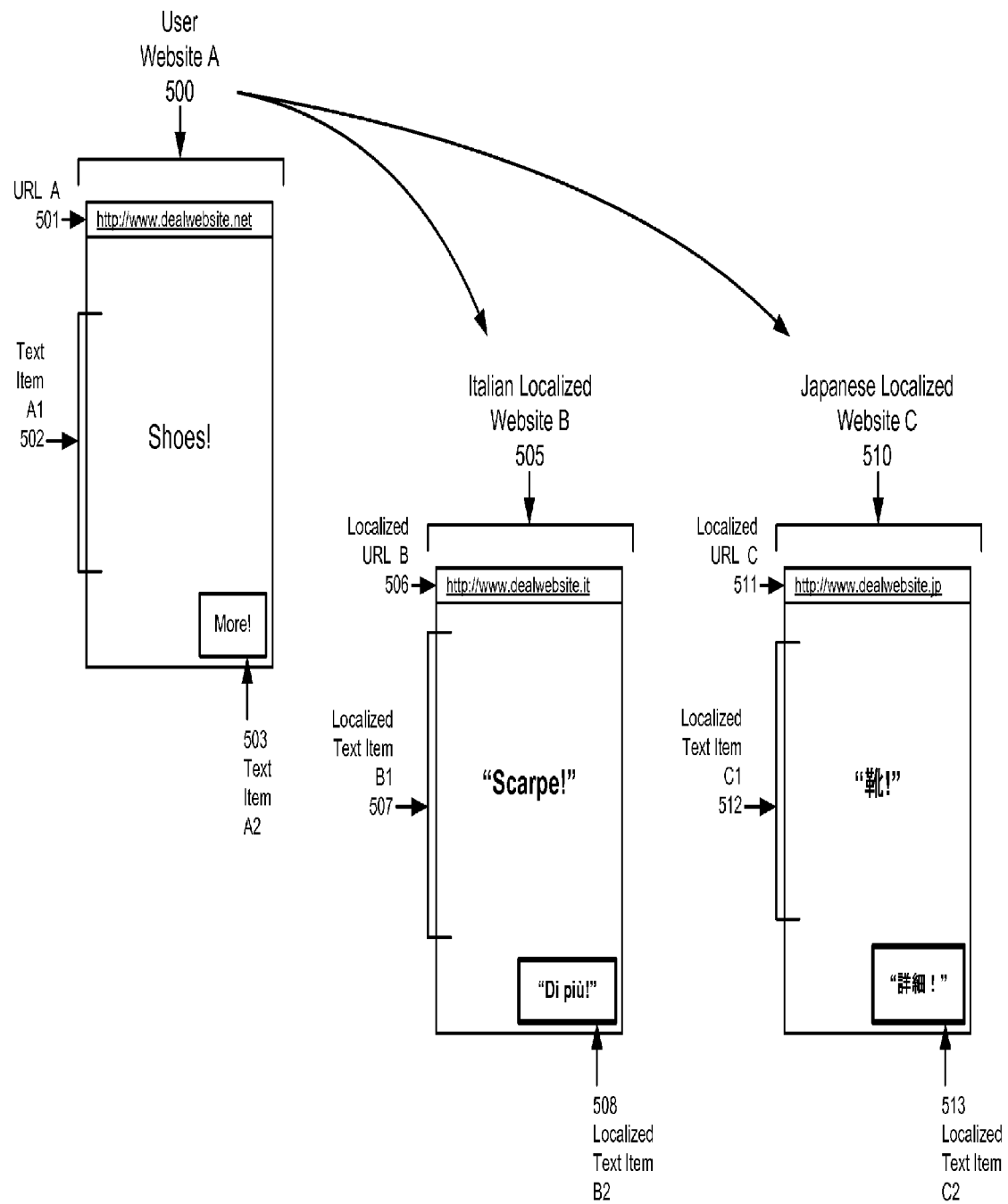
FIG. 5 shows localized website examples in accordance with one or more embodiments of the invention.

FIG. 5 shows examples of a user website, an Italian localized website, and a Japanese localized website, in accordance with one or more embodiments of the invention. The elements shown in FIG. 5 may be used, for example, with the system to generate the localized websites. The elements shown in FIG. 5 may differ among embodiments of the invention, and one or more of the elements may be optional.

FIG. 5 demonstrates the user website A (500), which has a URL A (501) (i.e. "http://www.dealwebsite.net"). The user website A (500) is a website oriented on an English language customer base, and therefore includes text written in the English language. The user website A (500) may be focused on any of the geographic regions in which English is the official language (e.g. the U.S., the United Kingdom, Australia, etc.). The user website A (500) contains a text item A1 (502) (i.e. "Shoes!"), and a submission button with the text "More!", identified by a text item A2 (503). Those skilled in the art will appreciate that the user website A (500) may be designed for an English speaking audience.

In one or more embodiments of the invention, an Italian localized website B (505) is a version of the user website A (500) that has been modified for an Italian audience. The Italian localized website B (505) has a modified URL—localized URL B (506) (i.e. "http://www.dealwebsite.it"), which has an Italian domain. The Italian localized website B (505) also has modified text in a localized text item B1 (507), which has been changed to "Scarpe!" (i.e. the Italian translation of "shoes!") from the text "Shoes!" in the text item A1 (502). The localized text item B1 (507) has been bolded as well. The Italian localized website B (505) also has modified text in a localized text item B2 (508), which has been changed to "Di più!" (i.e. the Italian translation of "More!") from the text "More!" in the text item A2 (503). These modified text items have better traffic rates, conversion rates, and/or user interface elements for an Italian speaking audience than the text item A1 (502) and text item A2 (503). The result is more traffic, more conversions, and/or a better user experience than the original user website A (500) for Italian speaking users. This may result in more sales for the Italian localized website in the Italian market.

In one or more embodiments of the invention, a Japanese localized website C (510) is a version of the user website A (500) that has been modified for a Japanese audience. The Japanese localized website C (510) has a modified URL—localized URL C (511) (i.e. "http://www.dealwebsite.jp"), which has a Japanese domain. The Japanese localized website C (510) also has modified text in a localized text item C1 (512), which has been changed to "靴！" (i.e. the Japanese translation of "shoes!") from the text "Shoes!" in the text item A1 (502). The localized text item C1 (512) has been bolded as well. The Japanese localized website C (510) also has modified text in a localized text item C2 (513), which has been changed to "詳細！" (i.e. the Japanese translation of "More!") from the text "More!" in the text item A2 (503). These modified text items have better traffic rates, conversion rates, and/or user interface elements for a Japanese speaking audience than a text item A1 (502) and a text item A2 (503). The result is more traffic, more conversions, and/or a better user experience than the original user website A (500) for Japanese speaking users. This may result in more sales for the Japanese localized website in the Japanese market.

Figure 6A:
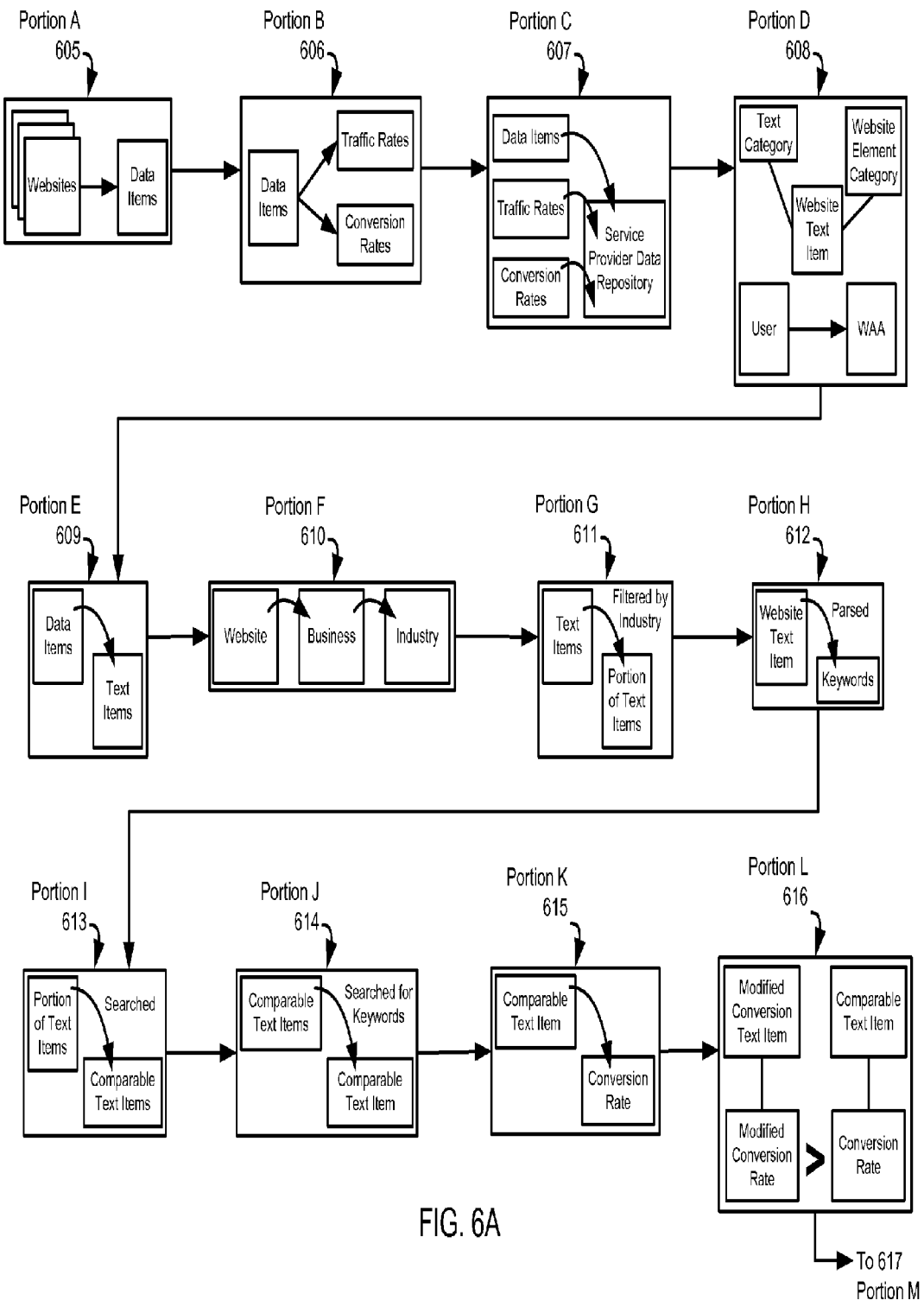
FIGS. 6A, 6B, and 6C show example scenarios in accordance with one or more embodiments of the invention.
Figure 6B:
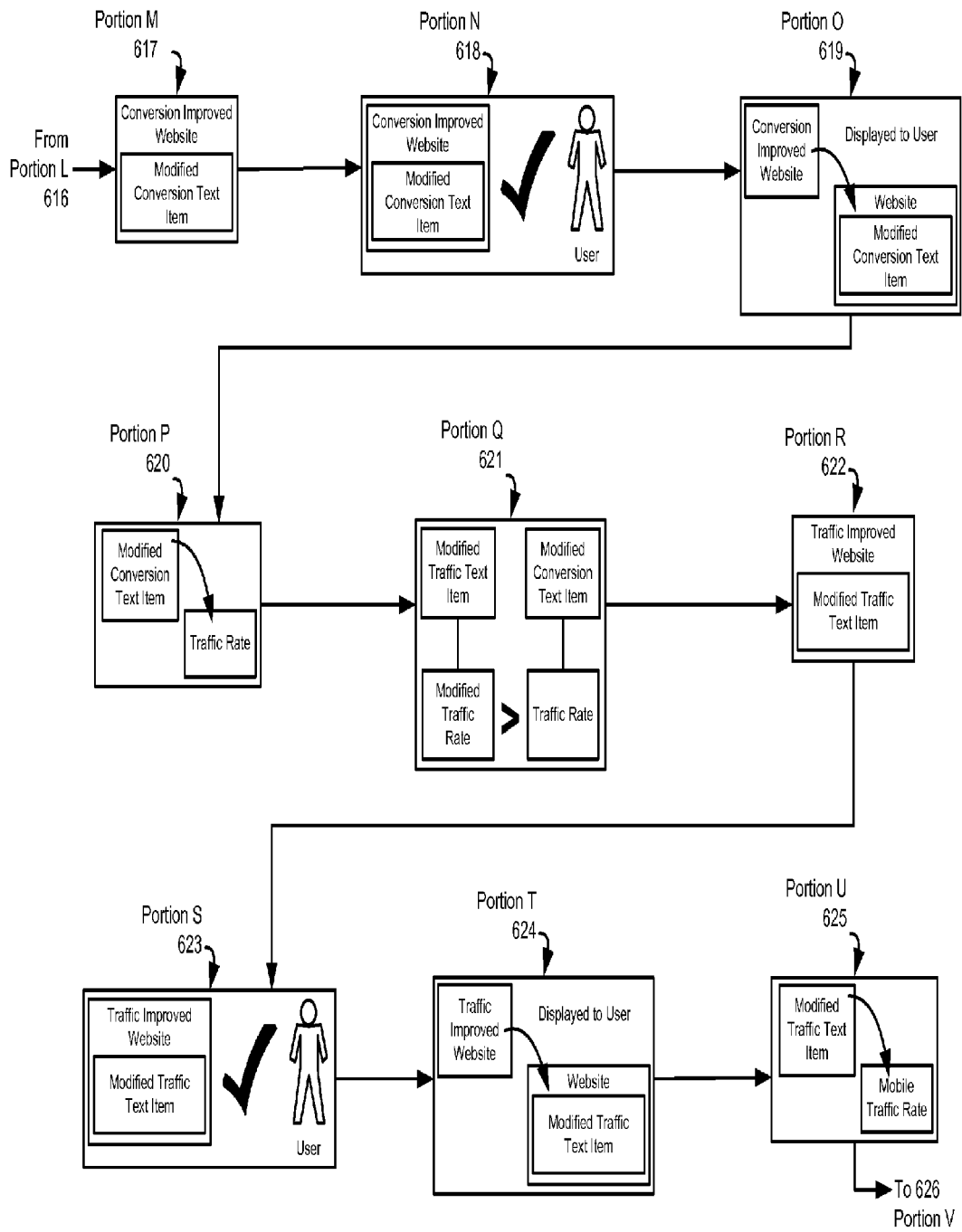
Figure 6C:
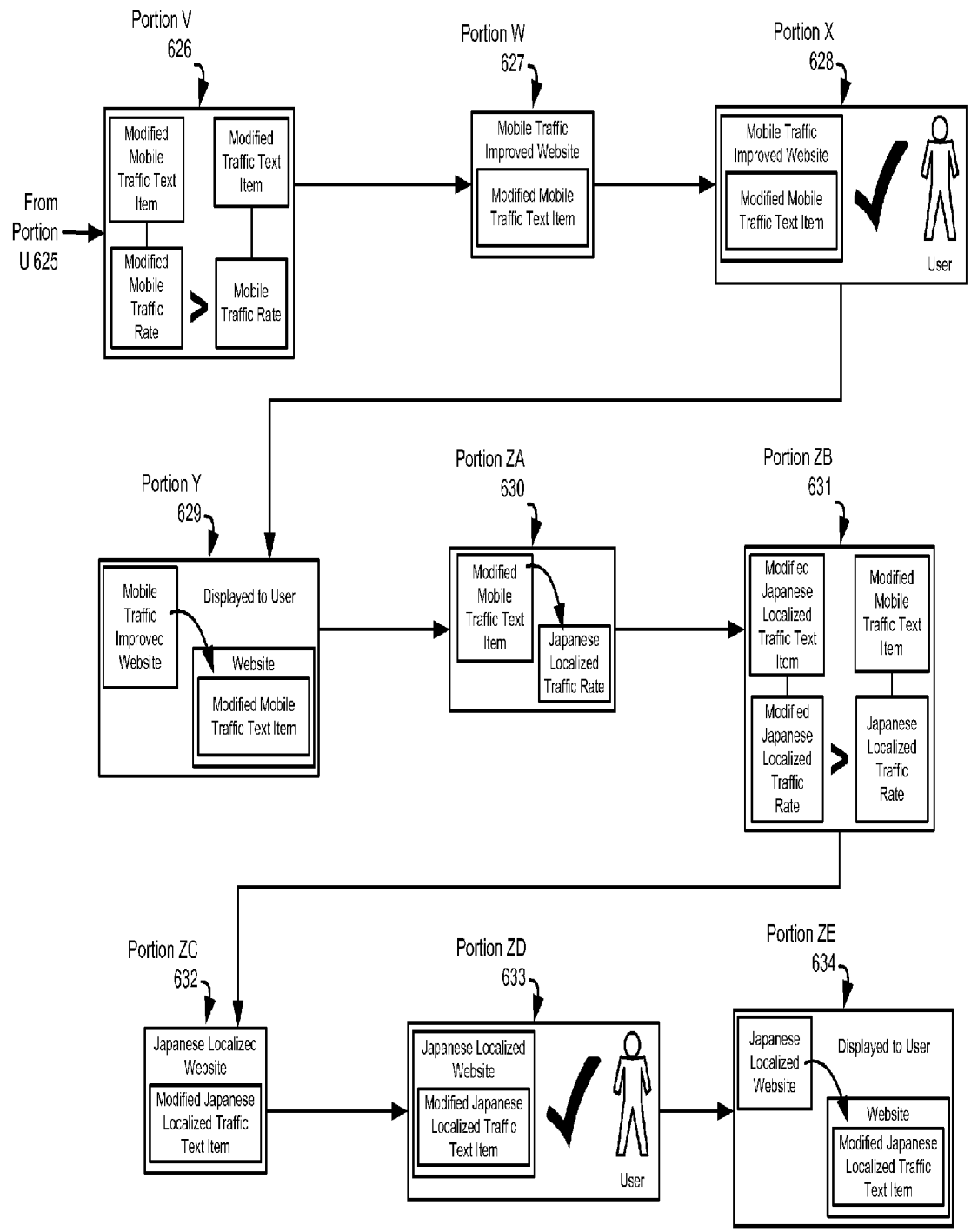

FIGS. 6A, 6B, and 6C show examples of the generation of improved websites in accordance with one or more embodiments of the invention. The process shown in FIGS. 6A, 6B, and 6C may be used, for example, with the software application to generate improved websites. The portions shown in FIGS. 6A, 6B, and 6C may differ among embodiments of the invention, and one or more of the portions may be performed in parallel and/or may be optional.

In Portion A (605), data items are obtained from websites. The websites may include, for example, websites for flower businesses, websites for men's tailored shirts businesses, and websites for videogame companies. The data items may include, for instance, text from landing page submission buttons, text from landing pages, pictures, and videos.

In Portion B (606), traffic rates and conversion rates of the data items are obtained. These may be obtained from the websites, or any other source. For example, the traffic rate of a landing page text may be 15% (i.e. 15% of the website's traffic goes through the landing page with the landing page text), and the conversion rate of a submission button may be 64% (i.e. 64% of visitors to the page including the submission button click on the submission button).

In Portion C (607), the data items, traffic rates, and conversion rates are stored in a service provider data repository. The service provider may be the owner, manager, and/or developer of the software application. Once the data items, traffic rates, and conversion rates are stored in the data repository, they may be analyzed and modified in various ways by the software application.

In Portion D (608), the website analytics application (WAA) (i.e. the software application) receives, from a user, a website text item belonging to a text category and a website element category. The website text item may be, for instance, the text in the submission button of a landing page of a user website. The user website may relate to a men's tailored shirts business. The text may read "Buy a product." The text category indicates that the website text item contains text, and the website element category indicates that the website text item relates to a submission functionality.

In Portion E (609), the WAA identifies, using the text category, text items of the data items. This may be performed, for instance, by filtering the data items for those that are text. In this case, only text from landing page submission buttons and text from landing pages will be produced by the filter. Pictures and videos will not, because they are not text items.

In Portion F (610), the WAA identifies an industry of the business relating to the website. Since the user website relates to a men's tailored shirts business, the industry of the user website may be retail/apparel.

In Portion G (611), the WAA identifies the text items (or portion of text items) associated with websites related to businesses in the industry. In this case, text from landing page submission buttons and text from landing pages may both originate from websites that relate to men's tailored shirts businesses. This amounts to filtering the text items by industry.

In Portion H (612), the WAA parses the website text item to generate keywords. Since the website text item contains the text "Buy a product," parsing this text will result in keywords including "Buy", "a", and "product". These keywords may be associated with metadata. For instance, the frequency of occurrence of each keyword may be identified, and saved in the data repository. In this case, each keyword occurs with a frequency of "1."

In Portion I (613), the WAA searches the text items associated with websites related to businesses in the industry for the website element category to identify comparable text items. For instance, text from landing page submission buttons and text from landing pages are essentially filtered to identify those text items that have the same functionality as the website text item. In this case, text from landing page submission buttons may be categorized in the same website element category as the website text item, while the text from landing pages is not. Therefore, this search may result in text from landing page submission buttons (i.e. comparable text items).

In Portion J (614), the WAA identifies a comparable text item of the comparable text items by searching the comparable text items for the keywords. For instance, the comparable text items (i.e. text from landing page submission buttons) are searched for keywords (i.e. "Buy," "a," and "product"), to identify a comparable text item. The comparable text item may be text from a landing page submission button that includes "Buy one of these products." The comparable text item is meant to be used as a proxy for the website text item in the system at this point in the process.

In Portion K (615), the WAA identifies the conversion rate of the comparable text item. The conversion rate of the text from a landing page submission button that includes "Buy one of these products" may be 72% (i.e. 72% of visitors to the page including the submission button click on the submission button). This conversion rate may be obtained from the data repository, from the website containing the comparable text item, or another source.

In Portion L (616), the WAA identifies a modified conversion text item of the comparable text items that has a modified conversion rate that exceeds the conversion rate of the comparable text item. The modified conversion text item may be, for instance, text from a landing page submission button that includes "Buy a shirt!" This text item is close enough to the comparable text item to be in the same functional and text category, however is slightly different in the actual text. The modified conversion text item may have a modified conversion rate of 75% (i.e. 75% of visitors to the page including the submission button click on the submission button). This higher conversion rate may be attributed to the difference between the text in the modified conversion text item and the text in the comparable text item (considering all other factors equal). Essentially, then modified conversion text item is a "better" choice for text from a conversion perspective than the comparable text item, or the website text item, since the comparable text item is a proxy for the website text item.

In Portion M (617), the WAA generates a conversion improved website that includes the modified conversion text item and displays it to the user. Therefore, the conversion improved website includes the text on a landing page submission button that includes "Buy a shirt!".

In Portion N (618), the user accepts the conversion improved website. The user may accept the conversion improved website because the specific portion of the website including the modified conversion text item has a higher conversion rate (i.e. 75%) than the specific portion of the website including the website text item or the comparable text item (i.e. 72%).

In Portion O (619), the WAA generates a website that includes the modified conversion text item that is based on the conversion improved website, and displays it to the user. This website will be the latest version of the user website, and may be published on the Internet for world wide access by website visitors and customers.

In Portion P (620), the WAA identifies the traffic rate of the modified conversion text item. The traffic rate may be 54% (i.e. 54% of visitors to the website go through the landing page including the submission button).

In Portion Q (621), the WAA identifies a modified traffic text item of the comparable text items that includes a modified traffic rate that exceeds the traffic rate of the modified conversion text item. The modified traffic text item may be, for instance, text from a landing page submission button that includes "Buy a new shirt!". This text item is close enough to the modified conversion text item to be in the same functional and text category, however is slightly different in the actual text. The modified traffic text item may have a modified traffic rate of 62% (i.e. 62% of visitors to the website go through the landing page including the submission button). This higher conversion rate may be attributed to the difference between the text in the modified traffic text item and the text in the modified conversion text item (considering all other factors equal). Essentially, then modified traffic text item is a "better" choice for text from a traffic perspective than the modified conversion text item.

In Portion R (622), the WAA generates a traffic improved website that includes the modified traffic text item and displays it to the user. Therefore, the traffic improved website includes the text on a landing page submission button that includes "Buy a new shirt!".

In Portion S (623), the user accepts the traffic improved website. The user may accept the traffic improved website because the specific portion of the website including the modified traffic text item has a higher traffic rate (i.e. 62%) than the specific portion of the website including the modified conversion text item (i.e. 54%).

In Portion T (624), the WAA generates the website including the modified traffic text item that is based on the traffic improved website. This website will be the latest version of the user website, and may also be published on the Internet for world wide access by website visitors.

In Portion U (625), the WAA identifies the mobile traffic rate of the modified traffic text item. The mobile traffic rate may be 35% (i.e. 35% of mobile visitors to the mobile version of the website go through the landing page including the submission button).

In Portion V (626), the WAA identifies a modified mobile traffic text item of the comparable text items that includes a modified mobile traffic rate that exceeds the mobile traffic rate of the modified traffic text item. The modified mobile traffic text item may be, for instance, text from a landing page submission button that includes "Buy a brand new shirt!". This text item is close enough to the modified traffic text item to be in the same functional and text category, however is slightly different in the actual text. The modified mobile traffic text item may have a modified mobile traffic rate of 45% (i.e. 45% of mobile visitors to the mobile version of the website go through the landing page including the submission button). This higher conversion rate may be attributed to the difference between the text in the modified mobile traffic text item and the text in the modified traffic text item (considering all other factors equal). Essentially, then modified mobile traffic text item is a "better" choice for text from a mobile website traffic perspective than the modified traffic text item.

In Portion W (627), the WAA generates a mobile traffic improved website that includes the modified mobile traffic text item and displays it to the user. Therefore, the mobile traffic improved website includes the text on a landing page submission button that includes "Buy a brand new shirt!".

In Portion X (628), the user accepts the mobile traffic improved website. The user may accept the mobile traffic improved website because the specific portion of the website including the modified mobile traffic text item has a higher traffic rate (i.e. 45%) than the specific portion of the website including the modified traffic text item (i.e. 35%).

In Portion Y (629), the WAA generates the website including the modified mobile traffic text item that is based on the mobile traffic improved website. This website will be the latest version of the user website, and may also be published on the Internet for world wide access by mobile website visitors.

In Portion ZA (630), the WAA identifies the Japanese localized traffic rate of the modified mobile traffic text item. The traffic rate may be 75% (i.e. 75% of Japanese speaking visitors to the website go through the landing page including the submission button).

In Portion ZB (631), the WAA identifies a modified Japanese localized traffic text item of the comparable text items that includes a modified Japanese localized traffic rate that exceeds the Japanese localized traffic rate of the modified mobile traffic text item. The modified Japanese localized traffic text item may be, for instance, text from a landing page submission button that includes "Buy a trendy new shirt!" (in Japanese). This text item is close enough to the modified mobile traffic text item to be in the same functional and text category, however is different in the actual text. The modified Japanese localized traffic text item may have a modified Japanese localized traffic rate of 87% (i.e. 87% of visitors to the website go through the landing page including the submission button). This higher conversion rate may be attributed to the difference between the text in the modified Japanese localized traffic text item and the text in the modified mobile traffic text item (considering all other factors equal). Essentially, then modified Japanese localized traffic text item is a "better" choice for text from a traffic perspective for a Japanese speaking audience than the modified mobile traffic text item.

In Portion ZC (632), the WAA generates a Japanese localized website that includes the modified Japanese localized traffic text item and display it to the user. Therefore, the traffic improved website includes the text on a landing page submission button that includes "Buy a trendy new shirt!" (in Japanese).

In Portion ZD (633), the user accepts the Japanese localized website. The user may accept the Japanese localized website because the specific portion of the website including the modified Japanese localized traffic text item has a higher traffic rate (i.e. 87%) than the specific portion of the website including the modified mobile traffic text item (i.e. 75%).

In Portion ZE (634), the WAA generates the website including the modified Japanese localized traffic text item that is based on the Japanese localized website. This website will be the latest version of the user website, and may also be published on the Internet for world wide access by Japanese speaking website visitors.

Figure 7:
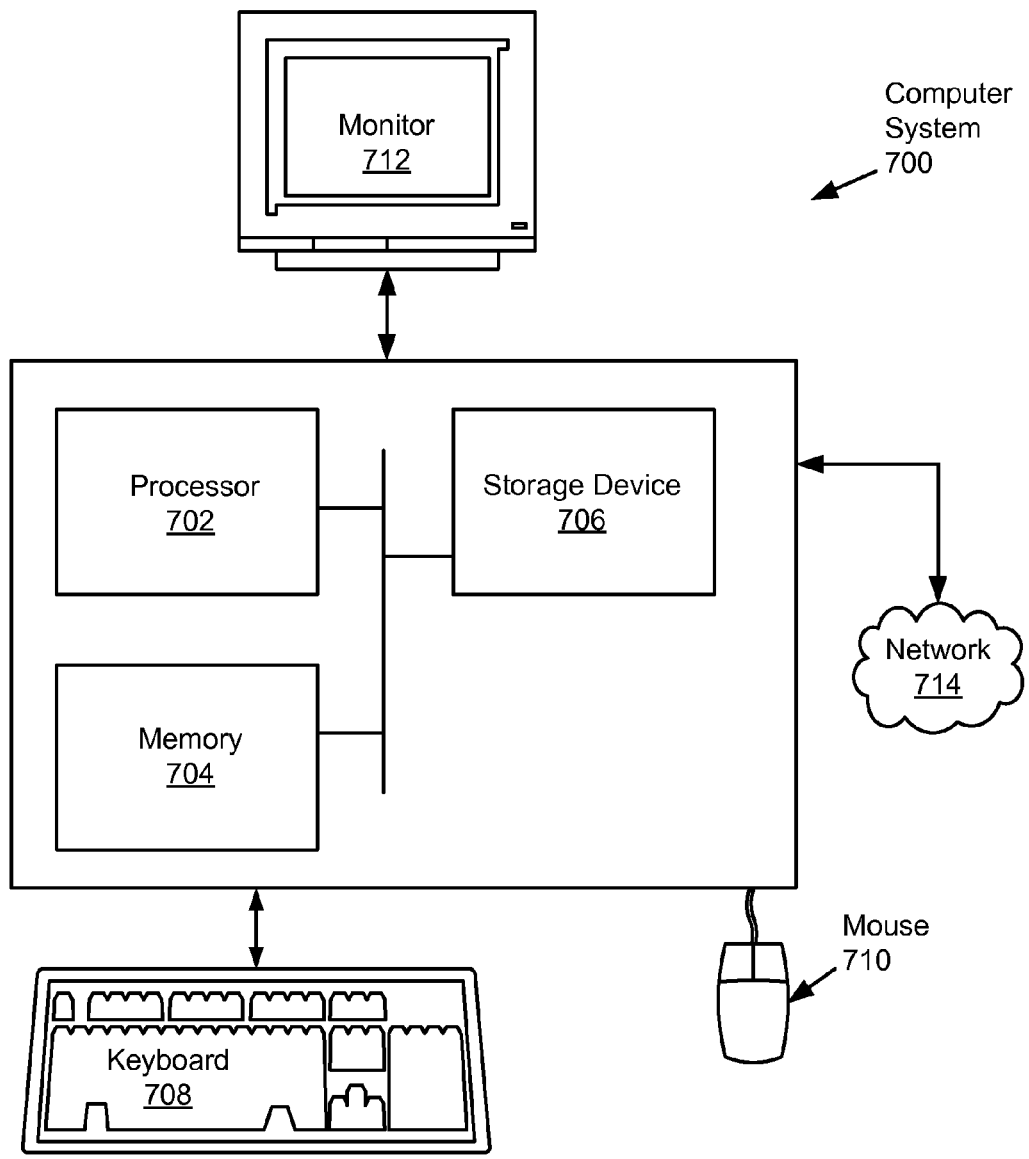
FIG. 7 shows a computer system in accordance with one or more embodiments of the invention.

Embodiments of the invention may be implemented on virtually any type of computer regardless of the platform being used. For example, as shown in FIG. 7, a computer system (700) includes one or more processor(s) (702) such as an integrated circuit, a central processing unit, or other hardware processor, associated memory (704) (e.g. random access memory (RAM), cache memory, flash memory, etc.), storage device (706) (e.g. a hard disk, an optical drive such as a compact disk drive or digital video disk (DVD) drive, a flash memory stick, etc.), and numerous other elements and functionalities typical of today's computers (not shown). In one or more embodiments of the invention, processor (702) is hardware. For example, the processor may be an integrated circuit. Computer system (700) may also include input means, such as keyboard (708), mouse (710), or a microphone (not shown). Further, computer system (700) may include output means, such as monitor (712) (e.g. a liquid crystal display (LCD), a plasma display, or cathode ray tube (CRT) monitor). Computer system (700) may be connected to network (714) (e.g. a local area network (LAN), a wide area network (WAN) such as the Internet, or any other type of network) via a network interface connection (not shown). In one or more embodiments of the invention, many different types of computer systems exist, and the aforementioned input and output means may take other forms. Generally speaking, computer system (700) includes at least the minimal processing, input, and/or output means necessary to practice embodiments of the invention.

Further, in one or more embodiments of the invention, one or more elements of the aforementioned computer system (700) may be located at a remote location and connected to the other elements over a network. Further, embodiments of the invention may be implemented on a distributed system having a plurality of nodes, where each portion of the invention (e.g. web analytics application, aggregate data engine, website text item engine, text filter engine, industry engine, industry filter engine, parsing engine, comparables filter engine, comparable item engine, conversion rate engine, conversion improvement engine, conversion website generation engine, and traffic improvement engine) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other non-transitory computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing a website, comprising:
obtaining a plurality of data items from a plurality of websites, wherein each of the plurality of data items comprises a conversion rate corresponding to a percentage of transactions completed by a plurality of website visitors accessing the data item;
receiving, by the processor and from a user, a website text item of the website;
identifying a business type of the website and a website element category of the website text item;
searching, by the processor and using the business type and the website element category, the plurality of data items to identify a subset of the plurality of data items;
identifying, by the processor and from the subset, a comparable text item to the website text item;
identifying, by the processor and from the subset, a modified text item, wherein a conversion rate of the modified text item exceeds a conversion rate of the comparable text item;
generating, using the processor, a conversion improved website comprising the modified text item, wherein the modified text item replaces the website text item;
receiving, from the user, an approval of the conversion improved website;
obtaining a localized traffic rate of the comparable text item;
identifying a modified localized traffic text item comprising a modified localized traffic rate that exceeds the localized traffic rate;
generating a localized traffic improved web site comprising the modified localized traffic text item, wherein the modified localized traffic text item is text;
receiving, from the user, a fourth approval of the localized traffic improved website; and
generating, based on the fourth approval, the website comprising the modified localized traffic text item based on the localized traffic improved website,
wherein the localized traffic improved website receives more traffic originating from a country than the website comprising the website text item.

2. The method of claim 1,
wherein the website element category indicates the functionality of the website text item in the website.

3. The method of claim 1, further comprising:
receiving, from the user, a rejection of the conversion improved website; and
generating the website comprising the website text item.

4. The method of claim 1, wherein the transactions completed by the plurality of website visitors are sales of a product.

5. The method of claim 1, further comprising:
obtaining a traffic rate of the comparable text item;
identifying a modified traffic text item comprising a modified traffic rate that exceeds the traffic rate;
generating a traffic improved website comprising the modified traffic text item, wherein the modified traffic text item is text;
receiving, from the user, a second approval of the traffic improved website; and
generating, based on the second approval, the website comprising the modified traffic text item based on the traffic improved website.

6. The method of claim 5, wherein the traffic rate is a number of total website visits by website visitors.

7. The method of claim 5, wherein the traffic improved website receives more traffic than the website comprising the website text item.

8. The method of claim 5, further comprising:
modifying the comparable text item by adding text to the comparable text item to generate the modified traffic text item.

9. The method of claim 1, further comprising:
obtaining a mobile traffic rate of the comparable text item;
identifying a modified mobile traffic text item comprising a modified mobile traffic rate that exceeds the mobile traffic rate;
generating a mobile traffic improved website comprising the modified mobile traffic text item, wherein the modified mobile traffic text item is text;
receiving, from the user, a third approval of the mobile traffic improved website; and
generating, based on the third approval, the website comprising the modified mobile traffic text item based on the mobile traffic improved website.

10. The method of claim 9, wherein the mobile traffic improved website receives more mobile traffic than the website comprising the website text item.

11. A method for managing a website, comprising:
obtaining a plurality of data items from a plurality of websites, wherein each of the plurality of data items comprises a conversion rate corresponding to a percentage of transactions completed by a plurality of website visitors accessing the data item;
receiving, by the processor and from a user, a website text item of the website;
identifying a business type of the website and a website element category of the website text item;
searching, by the processor and using the business type and the website element category, the plurality of data items to identify a subset of the plurality of data items;
identifying, by the processor and from the subset, a comparable text item to the website text item;
identifying, by the processor and from the subset, a modified text item, wherein a conversion rate of the modified text item exceeds a conversion rate of the comparable text item;
generating, using the processor, a conversion improved website comprising the modified text item, wherein the modified text item replaces the website text item;
receiving, from the user, an approval of the conversion improved website;
obtaining a localized traffic rate of the comparable text item;
identifying a modified localized traffic text item comprising a modified localized traffic rate that exceeds the localized traffic rate;
generating a localized traffic improved web site comprising the modified localized traffic text item, wherein the modified localized traffic text item is text;
receiving, from the user, a fourth approval of the localized traffic improved website;
generating, based on the fourth approval, the website comprising the modified localized traffic text item based on the localized traffic improved website; and modifying the comparable text item by translating the comparable text item from a first language to a second language to generate the modified localized traffic text item.

12. A method for managing a website, comprising:
obtaining a plurality of data items from a plurality of websites, wherein each of the plurality of data items comprises a conversion rate corresponding to a percentage of transactions completed by a plurality of website visitors accessing the data item;
receiving, by the processor and from a user, a website text item of the website;
identifying a business type of the website and a website element category of the website text item;
searching, by the processor and using the business type and the website element category, the plurality of data items to identify a subset of the plurality of data items;
identifying, by the processor and from the subset, a comparable text item to the website text item;
identifying, by the processor and from the subset, a modified text item, wherein a conversion rate of the modified text item exceeds a conversion rate of the comparable text item;
generating, using the processor, a conversion improved website comprising the modified text item, wherein the modified text item replaces the website text item;
receiving, from the user, an approval of the conversion improved website;
obtaining a localized traffic rate of the comparable text item;
identifying a modified localized traffic text item comprising a modified localized traffic rate that exceeds the localized traffic rate;
generating a localized traffic improved web site comprising the modified localized traffic text item, wherein the modified localized traffic text item is text;
receiving, from the user, a fourth approval of the localized traffic improved website;
generating, based on the fourth approval, the website comprising the modified localized traffic text item based on the localized traffic improved website, and
changing a first country code top level domain of the website to a second country code top level domain.

13. A system for managing a website relating to an industry, comprising:
a processor;
a web analytics application executing the on the processor and configured to:
obtain a plurality of data items from a plurality of websites, wherein each of the plurality of data items comprises a conversion rate corresponding to a percentage of transactions completed by a plurality of website visitors accessing the data item;
receive, from a user, a website text item of the website;
identify a business type of the website and a website element category of the website text item;
search, using the business type and the website element category, the plurality of data items to identify a subset of the plurality of data items;
identify, from the subset, a comparable text item to the website text item;
identify, from the subset, a modified text item, wherein a conversion rate of the modified text item exceeds a conversion rate of the comparable text item;
generate a conversion improved website comprising the modified text item, wherein the modified text item replaces the website text item;
receive, from the user, an approval of the conversion improved website;
obtain a localized traffic rate of the comparable text item;
identify a modified localized traffic text item comprising a modified localized traffic rate that exceeds the localized traffic rate;
generate a localized traffic improved website comprising the modified localized traffic text item, wherein the modified localized traffic text item is text;
receive, from the user, a fourth approval of the localized traffic improved website; and
generate, based on the fourth approval, the website comprising the modified localized traffic text item based on the localized traffic improved website,
wherein the localized traffic improved website receives more traffic originating from a country than the website comprising the website text item.

14. The system of claim 13, wherein the website element category indicates the functionality of the website text item in the website.

15. The system of claim 13, wherein the transactions completed by the plurality of website visitors are sales of a product.

16. A non-transitory computer readable storage medium storing instructions for managing a website relating to an industry, the instructions executable on a processor and comprising functionality to:
obtain a plurality of data items from a plurality of websites, wherein each of the plurality of data items comprises a conversion rate corresponding to a percentage of transactions completed by a plurality of website visitors accessing the data item;
receive, from a user, a website text item of the website;
identify a business type of the website and a website element category of the website text item;
search, using the business type and the website element category, the plurality of data items to identify a subset of the plurality of data items;
identify, from the subset, a comparable text item to the website text item;
identify, from the subset, a modified text item, wherein a conversion rate of the modified text item exceeds a conversion rate of the comparable text item;
generate a conversion improved website comprising the modified text item, wherein the modified text item replaces the website text item;
receive, from the user, an approval of the conversion improved website;
obtain a localized traffic rate of the comparable text item;
identify a modified localized traffic text item comprising a modified localized traffic rate that exceeds the localized traffic rate;
generate a localized traffic improved website comprising the modified localized traffic text item, wherein the modified localized traffic text item is text;
receive, from the user, a fourth approval of the localized traffic improved website; and
generate, based on the fourth approval, the website comprising the modified localized traffic text item based on the localized traffic improved website,
wherein the localized traffic improved website receives more traffic originating from a country than the website comprising the website text item.

* * * * *